(12) United States Patent
Lewis et al.

(10) Patent No.: US 11,311,907 B2
(45) Date of Patent: Apr. 26, 2022

(54) SUPEROMNIPHOBIC COATINGS AND METHODS OF PREPARATION

(71) Applicant: UT-Battelle, LLC, Oak Ridge, TN (US)

(72) Inventors: Linda Lewis, Andersonville, TN (US); Michael Quinn, Knoxville, TN (US); Brent Dial, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 175 days.

(21) Appl. No.: 16/227,442

(22) Filed: Dec. 20, 2018

(65) Prior Publication Data
US 2019/0193115 A1 Jun. 27, 2019

Related U.S. Application Data

(60) Provisional application No. 62/609,633, filed on Dec. 22, 2017.

(51) Int. Cl.
| | |
|---|---|
| *C07F 7/08* | (2006.01) |
| *B05D 7/24* | (2006.01) |
| *B05D 3/00* | (2006.01) |
| *B05D 5/00* | (2006.01) |
| *B05D 5/08* | (2006.01) |
| *B05D 7/02* | (2006.01) |

(52) U.S. Cl.
CPC .............. *B05D 7/24* (2013.01); *B05D 3/007* (2013.01); *B05D 5/00* (2013.01); *B05D 5/083* (2013.01); *C07F 7/081* (2013.01); *B05D 7/02* (2013.01); *B05D 2203/35* (2013.01); *B05D 2401/10* (2013.01); *B05D 2506/10* (2013.01); *B05D 2518/10* (2013.01); *B05D 2518/12* (2013.01); *B05D 2601/22* (2013.01)

(58) Field of Classification Search
CPC .. B05D 7/24; B05D 3/007; B05D 5/00; C07F 7/081
See application file for complete search history.

(56) References Cited

U.S. PATENT DOCUMENTS

| | | | |
|---|---|---|---|
| 6,197,987 B1 * | 3/2001 | Jost ...................... | C08G 77/385 556/410 |
| 2005/0008784 A1 * | 1/2005 | Martin .................... | B08B 17/02 427/393.4 |
| 2012/0110752 A1 * | 5/2012 | Lamberty ................ | A61K 8/25 8/442 |
| 2016/0122558 A1 * | 5/2016 | Haddad .................. | B05D 5/083 524/263 |

OTHER PUBLICATIONS

Golovin K. et al., "Transparent, Flexible, Superomniphobic Surfaces with Ultra-Low Contact Angle Hysteresis", Angew. Chem. Int. Ed., (2013), 52, pp. 13007-13011 DOI: 10.1002/anie.201307222.
Kota A.K. "Superomniphobic surfaces: Design and durability", MRS Bulletin, (2013), 38, pp. 383-390.
Pan S. et al., "Superomniphobic Surfaces for Effective Chemical Shielding", J. Am. Chem. Soc., (2013), 135, pp. 578-581 dx.doi.org/10.1021/ja310517s.

* cited by examiner

*Primary Examiner* — Wenwen Cai
(74) *Attorney, Agent, or Firm* — Scully, Scott, Murphy & Presser, P.C.

(57) ABSTRACT

A composition useful for producing a superomniphobic coating on a substrate, the composition comprising a colloidal suspension of a fluorinated siloxane in a non-silicon-containing fluorinated solvent. In some embodiments, the composition further comprises particles of a hydrophobized metal oxide, e.g., silicon oxide, wherein the hydrophobized metal oxide may be fluorinated. In some embodiments, the composition further comprises a non-silicon-containing fluorinated polymer. The invention is also directed to methods for making the above composition. The invention is also directed to methods for using the above-described composition for rendering a substrate superomniphobic. The aforesaid method comprises depositing a liquid coating solution onto a substrate to form a coated substrate, followed by subjecting the coated substrate to a drying step to remove a liquid phase of the liquid coating solution, wherein the liquid coating solution comprises a colloidal suspension of a fluorinated siloxane in a non-silicon-containing fluorinated solvent.

13 Claims, No Drawings

US 11,311,907 B2

SUPEROMNIPHOBIC COATINGS AND METHODS OF PREPARATION

CROSS REFERENCE TO RELATED APPLICATION

The present application claims benefit of U.S. Provisional Application No. 62/609,633, filed on Dec. 22, 2017, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present disclosure is directed generally to superhydrophobic surfaces and more particularly to a composition for forming an optically transparent, superhydrophobic coating on a substrate.

BACKGROUND OF THE INVENTION

A superhydrophobic surface is a highly water-repellent surface characterized by a resistance to wetting and high water droplet contact angles. Surfaces with water droplet contact angles in excess of 90 degrees are generally considered to be hydrophobic. On a smooth surface, a water droplet can theoretically reach a maximum contact angle of 120 degrees. If the apparent water droplet contact angle exceeds 150 degrees, as may occur when a surface includes microscale asperities, the surface may be said to be superhydrophobic. Superhydrophobicity may be referred to as the "lotus leaf effect" given its origins in nature.

The surface of a lotus leaf is covered with countless microscopic protrusions coated with a waxy layer. This waxy layer acts as a multifunctional interface between the leaf and its environment, influencing airflow and light reflection, and imparting, along with the protrusions, very high water repellency to the surface of the leaf. Water falling on the leaf rolls over the surface as small droplets. The hydrophobic topographical microfeatures minimize the area of contact between a water droplet and the leaf surface, thereby keeping the droplet in contact mainly with the surrounding air. As a result, the water on the leaf surface substantially retains the droplet shape it would have in the air. The rough, waxy microstructures present on the lotus leaf result in contact angles as high as 170 degrees, thereby imparting to the surface enhanced superhydrophobic properties.

Surfaces may be roughened, patterned, or otherwise processed to obtain the microscale features deemed advantageous for superhydrophobicity. Superhydrophobic coatings may also be formed on a hydrophilic surface to impart superhydrophobic characteristics to the surface. For example, superhydrophobic coatings can be produced on glass to form windows with self-cleaning capabilities. Challenges remain, however, in producing coatings that are well-bonded to the underlying surface and which exhibit both excellent superhydrophobic properties and optical transparency. There is also a need for non-flammable and overall non-hazardous formulations for producing superhydrophobic coatings.

SUMMARY OF THE INVENTION

The instant disclosure is foremost directed to liquid compositions useful for producing superomniphobic coatings on a variety of substrates. The compositions described herein are generally non-flammable and non-volatile. The compositions can also be prepared by simple means and are also highly amenable for deposition by a variety of means (e.g., spraying or dipping) onto any of a variety of substrates to render them superhydrophobic. At the least, the compositions contain a colloidal suspension of a fluorinated siloxane in a non-silicon-containing fluorinated solvent. In further embodiments, the composition further contains a hydrophobized metal oxide aerogel, and/or a non-silicon-containing fluorinated or non-fluorinated polymer, wherein the fluorinated or non-fluorinated polymer generally functions as a binder.

In another aspect, the instant disclosure is directed to a method for rendering a substrate superomniphobic. In the method, the liquid coating solution described above is deposited onto a substrate, followed by exposing the coated substrate to a drying step to remove the liquid portion (e.g., solvent portion). The coating solution can be deposited by any of the known deposition techniques, such as spray-coating, dip-coating, or spin-coating. The drying step can be practiced by, for example, air drying under ambient conditions or by heating. Moreover, the resulting superomniphobic coatings are advantageously substantially transparent and strongly bonded to the underlying surface.

In another aspect, the instant disclosure is directed to methods for producing the composition described above. In the method, the components of the coating solution (i.e., at minimum, the fluorinated siloxane and fluorinated solvent) are integrally mixed, such as by sonication, for a sufficient period of time until a homogeneous colloidal suspension is achieved.

DETAILED DESCRIPTION OF THE INVENTION

In a first aspect, the instant disclosure is directed to liquid compositions useful for producing superomniphobic coatings on a variety of substrates. The composition includes, at minimum, a fluorinated siloxane in a fluorinated solvent. The composition is also a colloidal suspension, which is herein understood to mean a population of microscopic colloidal particles suspended within the fluorinated solvent. The microscopic colloidal particles are sufficiently small such that they remain suspended and do not settle or otherwise separate out of the liquid upon standing or filtering. Generally, the microscopic colloidal particles are no more than 1 micron in size. In some embodiments, the microscopic colloidal particles have a size up to or less than, for example, 1,000, 500, 200, 100, or 50 nm. The microscopic colloidal particles are composed of, at minimum, the fluorinated siloxane. In embodiments where the liquid compositions include hydrophobized metal oxide aerogel and/or a non-silicon-containing fluorinated or non-fluorinated polymer, the microscopic colloidal particles may further include one or both of these additional components.

The term "fluorinated siloxane" refers to any compound containing at least one, two, or three Si—O—Si and/or Si—O—C bonds along with at least one fluorine atom bound to a silicon or carbon atom. In some embodiments, the fluorinated siloxane may contain precisely, at least, or up to 1, 2, 3, 5, 6, 7, 8, 9, 10, 12, 15, 20, 30, 40, or 50 silicon atoms, or a number of silicon atoms within a range bounded by any of these values. The siloxane may be cyclic, linear, or branched, or may include a combination of these features. The siloxane may also include any combination of M, D, T, and Q units, e.g., M and D units, or M and T units, or M, D, and T units, or M, D, and Q units, or M, T, and Q units, or M, D, T, and Q units. In some embodiments, a single fluorinated siloxane is included in the liquid composition, while in other embodiments, a mixture of at least two fluorinated siloxanes is included in the liquid composition. The fluorinated siloxane is typically included in an amount of at least 2 wt % with respect to the total weight of the liquid composition. Generally, the fluorinated siloxane is included in an amount of up to or less than 30 wt %. In different embodiments, the fluorinated siloxane is included in an amount of 2, 3, 4, 5, 10, 15, 20, 25, or 30 wt %, or in an amount within a range bounded by any two of the foregoing exemplary values.

In particular embodiments, the fluorinated siloxane contains at least one fluorinated alkyl group ($R_F$) bound to at least one of the Si atoms via a carbon atom of the fluorinated alkyl group (i.e., via a Si—C bond). The fluorinated siloxane may or may not also include one or more fluorine atoms bound to a silicon atom. In some embodiments, a Si—F bond is excluded. The fluorinated alkyl group can be straight-chained (linear), branched, or cyclic (i.e., cycloalkyl) and contains 1-20 carbon atoms and at least one, two, or three fluorine atoms replacing the equivalent number of hydrogen atoms of the alkyl group. In different embodiments, the fluorinated alkyl group independently contains precisely 1, 2, 3, 4, 5, 6, 7, 8, 9, 10, 11, 12, 13, 14, 15, 16, 17, 18, 19, or 20 carbon atoms, or a number of carbon atoms within a range bounded by any two of the foregoing values.

In some embodiments, the fluorinated alkyl group on the fluorinated siloxane is partially fluorinated, while in other embodiments, the fluorinated alkyl group is completely fluorinated (i.e., a perfluoroalkyl group). Some examples of partially fluorinated alkyl groups include fluoromethyl, difluoromethyl, 2-fluoroethyl, 2,2-difluoroethyl, 2,2,2-trifluoroethyl, 3-fluoropropyl, 3,3-difluoropropyl, 3,3,3-trifluoropropyl, 2,2,3,3,3-pentafluoropropyl, 4-fluorobutyl, 4,4-difluorobutyl, 4,4,4-trifluorobutyl, 3,3,4,4,4-pentafluorobutyl, 2,2,3,3,4,4,4-heptafluorobutyl, 5-fluoropentyl, 5,5-difluoropentyl, 5,5,5-trifluoropentyl, 4,4,5,5,5-pentafluoropentyl, 3,3,4,4,5,5,5-heptafluoropentyl, 2,2,3,3,4,4,5,5,5-nonafluoropentyl, 8-fluorooctyl, 8,8-difluorooctyl, 8,8,8-trifluorooctyl, 7,7,8,8,8-pentafluorooctyl, 6,6,7,7,8,8,8-heptafluorooctyl, 5,5,6,6,7,7,8,8,8-nonafluorooctyl, 4,4,5,5,6,6,7,7,8,8,8-undecafluorooctyl, 3,3,4,4,5,5,6,6,7,7,8,8,8-tridecafluorooctyl, 2,2,3,3,4,4,5,5,6,6,7,7,8,8,8-pentadecafluorooctyl, 10,10,10-trifluorodecyl, 9,9,10,10,10-pentafluorodecyl, 12,12,12-trifluorododecyl, and 11,11,12,12,12-pentafluorododecyl, and analogous fluorinated alkyl groups having up to twenty carbon atoms, and branched versions thereof. Some examples of fully fluorinated alkyl groups include perfluoromethyl (trifluoromethyl), perfluoroethyl (pentafluoroethyl or 1,1,2,2,2-pentafluoroethyl), perfluoropropyl (heptafluoropropyl, or 1,1,2,2,3,3,3-heptafluoropropyl), perfluoroisopropyl, perfluorobutyl, perfluoropentyl, perfluorohexyl, perfluoroheptyl, perfluorooctyl, perfluorononyl, perfluorodecyl, perfluoroundecyl, perfluorododecyl, perfluorotridecyl, perfluorotetradecyl, perfluoropentadecyl, perfluorohexadecyl, perfluoroheptadecyl, perfluorooctadecyl, perfluorononadecyl, and perfluoroeicosyl.

The fluorinated alkyl group may or may not also contain one or more heteroatoms, either as single heteroatoms or as heteroatom-containing groups. A heteroatom-containing group includes at least two atoms bound to each other, at least one of which is a heteroatom. Some examples of heteroatoms include nitrogen (N), oxygen (O), and sulfur (S). In some embodiments, a heteroatom interrupts a carbon-carbon bond, as in, e.g., —CH$_2$—O—CH$_2$—, wherein one or more of the hydrogen atoms may be substituted with fluorine atoms. In other embodiments, a heteroatom-containing group interrupts a carbon-carbon bond or replaces one or two hydrogen atoms on the same carbon atom. Some examples of a heteroatom-containing group interrupting a carbon-carbon bond include —CH$_2$—N(CH$_3$)—CH$_2$— and —CH$_2$—N(CH$_2$CH$_3$)—CH$_2$— wherein one or more of the hydrogen atoms may be substituted with fluorine atoms. Some examples of a heteroatom-containing group replacing one or two hydrogen atoms include —CH$_2$CH$_2$OH, —CH$_2$CH$_2$C(=O)CH$_3$, —CH$_2$CH$_2$C(=O)OH, —CH$_2$CH$_2$C(=O)OCH$_3$, —CH$_2$CH$_2$—N(CH$_3$)$_2$, and —CH$_2$CH$_2$—C(O)N(CH$_3$)$_2$, wherein one or more of the hydrogen atoms may be substituted with fluorine atoms. The fluorinated alkyl group may also include at least one heteroatom interrupting a carbon-carbon bond and at least one heteroatom-containing group replacing a hydrogen atom. Some examples of fluorinated alkyl groups containing at least one heteroatom include —CH$_2$—O—CF$_2$CF$_3$, —CF$_2$—O—CF$_2$CF$_3$, —CF$_2$CF$_2$OH, —CF$_2$CF(CF$_3$)OH, —CF$_2$C(CF$_3$)$_2$OH, —CF$_2$CF$_2$—O—CF$_2$CF$_2$OH, and —CF$_2$CF$_2$—N(CH$_3$)$_2$, wherein the foregoing groups may be bound to a silicon atom.

In a first exemplary embodiment, the fluorinated siloxane is a fluoroalkylsilatrane having the following structure:

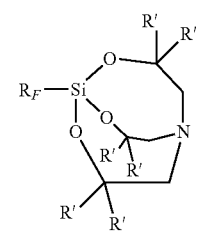

(1)

In Formula (1) above, $R_F$ is a fluorinated alkyl group, as describe above. In particular embodiments, $R_F$ is a fluorinated alkyl group having at least or more than three, four, five, six, seven, eight, nine, or ten carbon atoms. The group R' is independently selected (on the same carbon atom and between carbon atoms) from hydrogen atom and alkyl groups having 1-6 carbon atoms, wherein the alkyl groups are optionally substituted with fluorine atoms (i.e., the alkyl groups having 1-6 carbon atoms may also be selected from $R_F$ groups having 1-6 carbon atoms). In a first set of embodiments, all R' are hydrogen atoms (H). In a second set of embodiments, all R' are alkyl groups containing 1-6 carbon atoms, with no fluoro substitution. In a third set of embodiments, all R' are alkyl groups containing 1-6 carbon atoms, with fluoro substitution. In a fourth set of embodiments, a portion of R' are H atoms and a portion of R' are alkyl groups containing 1-6 carbon atoms, with or without fluoro substitution. For example, three R' may be H atoms and three R' may be alkyl groups containing 1-6 carbon atoms, with or without fluoro substitution. Typically, for the latter case, each carbon atom holding two R' groups has one R' as H and the other R' as an alkyl group containing 1-6 carbon atoms, with or without fluoro substitution.

In a second exemplary embodiment, the fluorinated siloxane is a linear siloxane having the following structure:

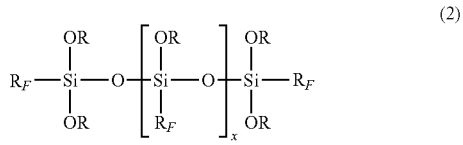
(2)

In Formula (2) above, $R_F$ is a fluorinated alkyl group, as describe above. In particular embodiments, $R_F$ is a fluorinated alkyl group having at least or more than three, four, five, six, seven, eight, nine, or ten carbon atoms. The group R is selected from alkyl groups having 1-6 carbon atoms, wherein the alkyl groups are optionally substituted with fluorine atoms (i.e., the alkyl groups having 1-6 carbon atoms may also be selected from $R_F$ groups having 1-6 carbon atoms). In one set of embodiments, the R groups are alkyl groups containing 1-6 carbon atoms, with no fluoro substitution. In another set of embodiments, the R groups are alkyl groups containing 1-6 carbon atoms, with fluoro substitution. The subscript x is typically an integer of 0 to 20. When x is 0, the middle portion of the siloxane is not present and Formula (2) simplifies as a disiloxane, i.e., $R_F$—Si(OR)$_2$—O—Si(OR)$_2$—$R_F$. In different embodiments, x can be 1, 2, 3, 4, 5, 6, 7, 8, 9, 10, 11, 12, 13, 14, 15, 16, 17, 18, 19, or 20, or a value within a range bounded by any two of the foregoing values, e.g., a value of at least 1, 2, 3, 4, 5, or 6 and up to 7, 8, 9, 10, 11, 12, 15, 18, or 20.

In a third exemplary embodiment, the fluorinated siloxane is a bridged siloxane having the following structure:

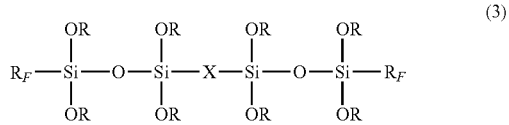
(3)

In Formula (3) above, $R_F$ is a fluorinated alkyl group, as describe above. In particular embodiments, $R_F$ is a fluorinated alkyl group having at least or more than three, four, five, six, seven, eight, nine, or ten carbon atoms. The group R is selected from alkyl groups having 1-6 carbon atoms, wherein the alkyl groups are optionally substituted with fluorine atoms (i.e., the alkyl groups having 1-6 carbon atoms may also be selected from $R_F$ groups having 1-6 carbon atoms). In one set of embodiments, the R groups are alkyl groups containing 1-6 carbon atoms, with no fluoro substitution. In another set of embodiments, the R groups are alkyl groups containing 1-6 carbon atoms, with fluoro substitution. The bridging group X is a hydrocarbon linking group, which may or may not be substituted with fluorine atoms. In a first embodiment, X is a straight-chained or branched alkyl group, as described above, having 1-20 carbon atoms. In the case of a straight-chained alkyl group, X can be conveniently represented by the formula —(CH$_2$)$_y$—, wherein y is precisely or at least 1, 2, 3, 4, 5, 6, 7, 8, 9, 10, 11, 12, 13, 14, 15, 16, 17, 18, 19, or 20, or a value within a range bounded by any two of the foregoing values, e.g., a value of at least 1, 2, 3, 4, 5, or 6 and up to 7, 8, 9, 10, 11, 12, 15, 18, or 20. In the case of a branched alkyl group, X can be expressed by the formula —(CH$_2$)$_y$—, as provided above, along with substitution of one or more hydrogen atoms in the X group with an alkyl group containing 1, 2, or 3 carbon atoms. X may alternatively be a cycloalkyl group having 3, 4, 5, 6, 7, or 8 carbon atoms. X may alternatively be a bridging alkenyl group, examples of which can be provided by replacing two hydrogen atoms on adjacent carbon atoms with a carbon-carbon double bond, for any of the exemplary alkyl groups provided above. X may alternatively be a bridging unsaturated ring, such as a cyclohexenyl, cyclohexadienyl, cyclopentadienyl, or phenylene bridging ring.

In a fourth exemplary embodiment, the fluorinated siloxane is a fluorinated cyclosiloxane. Typically, the fluorinated cyclosiloxane contains 3, 4, 5, 6, 7, 8, 9, or 10 silicon atoms (or Si—O units). The fluorinated cyclosiloxane may a fluorinated version of, for example, a cyclotrisiloxane, cyclotetrasiloxane, cyclopentasiloxane, cyclohexasiloxane, cycloheptasiloxane, cyclooctasiloxane, cyclononasiloxane, or cyclodecasiloxane. Typically, the fluorine atoms are located on fluorinated alkyl ($R_F$) groups, as described above, which are attached to the silicon atoms. Any of the partially or fully fluorinated $R_F$ groups described above may be included in the fluorinated cyclosiloxane. Some examples of fluorinated cyclosiloxanes include 2,2,4,4,6,6-hexakis(trifluoromethyl)cyclotrisiloxane, 2,4,6-trimethyl-2,4,6-tris(3,3,3-trifluoropropyl)cyclotrisiloxane, and 2,2,4,4,6,6,8,8-octakis(3,3,3-trifluoropropyl)cyclotetrasiloxane.

In a fifth particular embodiment, the fluorinated siloxane is a fluorinated silsesquioxane, also referred to as a fluorinated polyhedral oligomeric silsesquioxane (POSS). Generally, the fluorinated POSS contains 6, 8, 10, or 12 silicon vertices. Typically, the fluorine atoms are located on fluorinated alkyl ($R_F$) groups, as described above, which are attached to the silicon atoms. Any of the partially or fully fluorinated $R_F$ groups described above may be included in the fluorinated POSS. In some embodiments, fluorinated POSS compounds are excluded from the fluorinated siloxanes considered herein.

The fluorinated siloxane can be produced using methods well known in the art, or may, in some cases, be commercially available. For example, the method may employ self-condensation of a fluorinated trialkoxysiloxane (e.g., perfluorooctyltriethoxysilane) to form a disiloxane, trisiloxane, tetrasiloxane, pentasiloxane, hexasiloxane, or higher siloxane containing a fluorinated alkyl group (e.g., perfluorooctyl) on each silicon atom. Alternatively, the method may employ a condensation process between a trialkoxysiloxane and another molecule containing groups capable of condensing with a siloxy group. The other molecule may be, for example, a different siloxane, silanol, or a hydroxy-containing molecule.

The fluorinated solvent is any fluorinated hydrocarbon compound that behaves as a liquid close to or under ambient conditions (e.g., up to about 50, 40, 35, 30, 35, or 20° C. and at about 1 atm). More typically, the fluorinated solvent has a melting point up to or less than 20, 10, or 0° C. The fluorinated solvent includes at least carbon, hydrogen, and fluorine atoms, and may or may not include one or more heteroatoms (e.g., oxygen and/or nitrogen), as above, and may be partially or fully fluorinated. The fluorinated solvent generally does not contain silicon. Moreover, the fluorinated solvent should not interfere with the formation and stability of colloidal particles suspended in the fluorinated solvent. In some embodiments, a single fluorinated solvent is included in the liquid composition, while in other embodiments, a mixture of at least two fluorinated solvents is included in the liquid composition. In some embodiments, the fluorinated solvent may be in admixture with a non-fluorinated solvent (e.g., acetone or an alcohol), while in other embodiments a non-fluorinated solvent is excluded.

In a first exemplary embodiment, the fluorinated solvent is a perfluorinated hydrocarbon having at least six carbon atoms. In different embodiments, the perfluorinated hydrocarbon contains at least six, seven, eight, nine, ten, eleven, or twelve carbon atoms. The perfluorinated hydrocarbon may be, for example, a perfluorinated straight-chained, branched, or cyclic alkane. Some examples of perfluorinated alkanes include perfluorohexane (tetradecafluorohexane), perfluoroheptane, perfluorooctane, perfluorononane, perfluorodecane, perfluoroundecane, perfluorododecane, perfluorotridecane, perfluorotetradecane, perfluoropentadecane, perfluorohexadecane, perfluorooctadecane, perfluoro-2-methylpentane, perfluoro-2,2,3,4-tetramethylpentane, perfluorocyclopentane, perfluoro(methylcyclopentane), perfluorocyclohexane, perfluoro(methylcyclohexane), perfluoro-1,2-dimethylcyclohexane, perfluoro-1,3-dimethylcyclohexane, and perfluorodecalin.

In a second exemplary embodiment, the fluorinated solvent is a perfluorinated trialkylamine. The perfluorinated trialkylamine can be conveniently represented by the formula $N[(CF_2)_vCF_3]_3$, wherein v is generally an integer of, for example, 1, 2, 3, 4, 5, 6, or 7. Some examples of perfluorinated trialkylamines include perfluorotriethylamine (v=1), perfluorotripropylamine (v=2), perfluorotributylamine (v=3), perfluorotripentylamine (v=4), perfluorotrihexylamine (v=5), perfluorotriheptylamine (v=6), and perfluorotrioctylamine (v=7). Although the foregoing perfluorinated trialkylamines have identical fluorinated substituents, the perfluorinated trialkylamines considered herein may contain different fluorinated substituents. An example of a perfluorinated trialkylamine with non-equivalent substituents includes perfluoro(di-n-butylmethylamine).

In a third exemplary embodiment, the fluorinated solvent is a perfluorodialkyl ether. The perfluorodialkyl ether can be conveniently represented by the formula $CF_3(CF_2)_w—O—(CF_2)_wCF_3$, wherein w is generally an integer of, for example, 1, 2, 3, 4, 5, 6, 7, or 8, taken independently. Some examples of perfluorodialkyl ethers include bis(pentafluoroethyl)ether (i.e., perfluorodiethyl ether), bis(heptafluoropropyl)ether, and bis(nonafluorobutyl)ether.

In a fourth exemplary embodiment, the fluorinated solvent is a perfluoroalkylated tetrahydrofuran. The perfluoroalkylated tetrahydrofuran includes at least one alkyl group that is perfluorinated; the tetrahydrofuran ring may or may not be fluorinated or perfluorinated. The perfluoroalkyl group generally contains at least two, three, or four carbon atoms and may be straight-chained or branched. Some examples of perfluoralkylated tetrahydrofurans include perfluoro(2-butyltetrahydrofuran) (i.e., with empirical formula $C_8F_{16}O$), perfluoro(2-pentyltetrahydrofuran), perfluoro(2-hexyltetrahydrofuran), perfluoro(2-heptyltetrahydrofuran), and perfluoro(2-octyltetrahydrofuran).

In a fifth exemplary embodiment, the fluorinated solvent is a fluorinated alcohol. In some embodiments, the fluorinated alcohol is partially fluorinated, as in a fluorotelomer alcohol. The fluorotelomer alcohol can be represented by the formula $F(CF_2)_zCH_2CH_2OH$, where z is typically an integer of at least 4, e.g., a value of 4, 5, 6, 7, 8, 9, 10, 11, or 12. Some other examples of partially fluorinated alcohols include 2-trifluoromethyl-2-propanol, 1,1,1,3,3,3-hexafluoroisopropanol, and 2,2,3,3,4,4,4-heptafluorobutanol. In other embodiments, the fluorinated alcohol is a perfluorinated alcohol. Some examples of perfluorinated alcohols include perfluoroethanol (pentafluoroethanol), perfluoro-n-propanol, perfluoroisopropanol (1,1,1,2,3,3,3-heptafluoroisopropanol), perfluoro-n-butanol (nonafluoro-n-butanol), perfluoro-t-butanol (nonafluoro-t-butanol), perfluoro-n-pentanol, perfluoro-n-hexanol, perfluoro-n-heptanol, perfluoro-n-octanol, perfluoro(2-phenyl-isopropanol), and perfluorocyclohexanol.

In some embodiments, the liquid composition further includes particles of a hydrophobized metal oxide, which may be an aerogel. In some embodiments, the particles are micron-sized, such as a size of, for example, 200, 100, 50, 20, 10, 5, 2, or 1 microns. In other embodiments, the particles are nano-sized, such as a size of, for example, 500, 200, 100, 50, 20, 10, or 5 nm. In other embodiments, the particles may have a size within a range of sizes bounded by any two of the exemplary sizes provided above (e.g., 5 nm or 10 nm to 1, 5, or 10 microns), wherein the sizes of the particles may be substantially monodisperse or disperse within the range of particle sizes selected. The hydrophobized metal oxide is typically included in an amount of at least 0.1 wt % and up to 15 wt % with respect to the total weight of the liquid composition. In different embodiments, the hydrophobized metal oxide is included in an amount of 0.1, 0.2, 0.5, 1, 2, 3, 4, 5, 10, 12, or 15 wt %, or in an amount within a range bounded by any two of the foregoing exemplary values.

Hydrophobized metal oxide particles are well known in the art, with many such compositions being commercially available. The hydrophobized metal oxides have a structure in which a central metal oxide portion has a surface attached to a multiplicity of hydrophobic groups, typically by condensation of hydrophobic-functionalized trialkoxysilane molecules onto the surface of the metal oxide particle. The hydrophobic portion in the functionalized siloxane molecules are typically long-chain alkyl siloxanes, such as, e.g., octyltrimethoxysilane. The metal oxide is often silicon oxide (silica). However, any metal oxide having a hydrophobized surface is considered herein, such as a hydrophobized aluminum oxide (alumina), zinc oxide, yttrium oxide (yttria), zirconium oxide, niobium oxide, iron oxide, gallium oxide, indium oxide, germanium oxide, tin oxide, lanthanum oxide, or cerium oxide. The hydrophobized metal oxide particles may also be fluorinated, generally by having fluorinated hydrocarbon groups on the surface of the metal oxide, as may be provided by a fluorinated long-chain alkyl siloxane.

In some embodiments, the liquid composition further includes one or more polymers that function as binders in the superomniphobic coating. The polymers may be fluorinated or non-fluorinated. Generally, the polymers do not include silicon. Polymers that provide an optically clear coat upon drying are preferred. The polymers may also be thermoplastic or thermosets. In some embodiments, instead of a polymer, the liquid composition includes precursors to a polymer, such as one or more monomer species (e.g., a vinyl monomer) that polymerize under appropriate conditions, or two species that react or crosslink with each other to form a final polymer (e.g., an organic isocyanate and a polyol or polyamine species). The polymer may also be a polymeric resin that further polymerizes and/or crosslinks during solution preparation or upon application onto a surface followed by drying. The polymer being included in the liquid composition (or as finally producing from precursors in the liquid composition) may be, for example, a polyurethane, polyacrylate (e.g., polyacrylic acid, polyacrylate salt, alkyl cyanoacrylate), polymethacrylate (e.g., polymethacrylic acid, polymethacrylate salt), polyamide, polyester, polyvinylalcohol, divinyl ester resin, unsaturated polyester resin, epoxy resin, polyether ether ketone (PEEK), polycarbonate, polyalkylene oxide (e.g., polyethylene oxide or polypropylene oxide), or polysulfone. The polymer is typically included in an amount of at least 0.1 wt % and up to 20 wt % with respect to the total weight of the liquid composition. In different embodiments, the polymer is included in an amount of 0.1, 0.2, 0.5, 1, 2, 3, 4, 5, 10, 12, 15, 18, or 20 wt %, or in an amount within a range bounded by any two of the foregoing exemplary values.

In some embodiments, the polymer is a fluorinated polymer, which may be a perfluorinated polymer. The fluorinated polymer may be, for example, a fluorinate version of any of the polymers described above. Other examples of fluoropolymers include fluorinated ethylene propylene (i.e., FEP, copolymer of tetrafluoroethylene (TFE) and hexafluoropropylene (HFP)), polytetrafluoroethylene (i.e., PTFE, homopolymer of TFE), poly(perfluoroalkylvinylether)s (e.g., Hyflon®), polyhexafluoropropylene (i.e., PHFP, homopolymer of HFP), polyhexafluoropropylene oxide (i.e., poly-HFPO) having the general structure (—CF(CF$_3$)—CF$_2$—O—)$_n$, polychlorotrifluoroethylene (i.e., PCTFE, homopolymer of chlorotrifluoroethylene, CTFE), polyvinylidene fluoride (i.e., PVDF, homopolymer of vinylidene fluoride, VDF (CH2=CF2)), copolymers of PVDF (e.g., PVDF-TrFE where TrFE is trifluoroethylene, or PVDF-HFP), polyvinylfluoride (i.e. PVF, homopolymer of vinylfluoride, VF), poly(ethylene-tetrafluoroethylene), poly(ethylene-chlorotrifluoroethylene), and homopolymers or copolymers of perfluorobutylethylene (PFBE).

In another aspect, the invention is directed to a method for rendering a substrate superomniphobic. In the method, the liquid composition (i.e., liquid coating solution) described above is deposited onto a substrate, followed by exposing the coated substrate to a drying step to remove the liquid phase (i.e., one or more solvents) from the liquid composition to thereby leave a coating of the solid components of the liquid composition on the substrate. The substrate can be any substrate having a surface for which a superomniphobic coating is desired. Often, the superomniphobic coating serves to protect an underlying substrate from adverse effects caused by contact with any of a variety of liquids, such as aqueous, hydrophilic organic, or hydrophobic organic solvents. The substrate can be composed of, for example, a metal, metal alloy, metal oxide, metal carbide, metal nitride, metal sulfide, metal selenide, or an organic (carbon-based) material, wherein the metal may be, e.g., one or more metals selected from transition metals (Groups 2-12 of the Periodic Table) and/or main group metals (e.g., Groups 13 or 14). More particularly, the substrate may be, for example, a steel, glass, ceramic, plastic, polymer, photovoltaic material, wood, paper, or fabric.

The liquid coating solution can be applied to the substrate by any suitable means known in the art for applying liquids onto surfaces. The liquid coating solution may be applied on the substrate by, for example, spray-coating, dip-coating, or spin-coating. If desired, the substrate may be cleansed or otherwise primed to optimize contact of the liquid solution and adherence of the resulting superomniphobic coating.

The substrate with liquid coating solution on its surface (i.e., the coated substrate) is then subjected to a drying step to remove the liquid phase to result in a solid coating adhered onto the surface of the substrate. The drying step can be practiced by, for example, air drying under ambient conditions or by heating the coated substrate to a temperature below a decomposition temperature of the liquid coating solution for sufficient time. The drying step may employ a temperature of, for example, 25, 30, 40, 50, 60, 70, 80, 90, 100, 110, 120, 130, 140, or 150° C. (or within a range bounded by any two of the foregoing values) for a period of time of at least 1, 5, 10, 20, 30, 40, 50, 60, 90, or 120 minutes (or within a range bounded by any two of the foregoing values).

The resulting coating is superomniphobic and preferably strongly adhered to the substrate and optically transparent. The thickness of the superomniphobic coating can vary depending on the method of deposition and composition of the liquid coating solution. The thickness is typically at least 10 nm (0.01 microns). In different embodiments, the coating may have a thickness of precisely, about, up to, less than, at least, or above, for example, 10 nm, 20 nm, 50 nm, 100 nm, 250 nm, 500 nm, 1000 nm (1 μm), 2 μm, or 5 μm, 10 μm, 50 μm, 100 μm, 150 μm, 200 μm, 250 μm, 300 μm, 350 μm, 400 μm, 500 μm, or 1000 μm (1 mm), or a thickness within a range bounded by any two of these values.

Examples have been set forth below for the purpose of illustration and to describe certain specific embodiments of the invention. However, the scope of this invention is not to be in any way limited by the examples set forth herein.

Example 1

An omniphobic coating may be formed as described in this section. First, commercially available nanogel aerogel particles (1.3 wt. %) and Fluorinert™ FC-40 solvent (98.7 wt. %) was added to a 100 mL beaker to form Solution A. The aerogel particle size was reduced to less than 100 nm by sonication of the mixture using a Hielscher™ Ultrasound Technology high-power ultrasonic probe at an amplitude of 80 for 1 hour. In a separate 100 mL beaker, Solution B was prepared by mixing FluoroPel™ 1602A (49.9 wt. %) and Fluorinert™ FC-40 (47.5 wt. %/o) with stirring. 5% Hyflon™ in Fluorinert™ FC-40 (2.6 wt. %) was slowly added to the stirring solution. Solutions A and B were mixed and then sonicated for 3 minutes prior to use.

A clean glass slide was coated with the omniphobic solution by dripping it onto the slide using a pipet, with subsequent drying in an oven at 65° C. overnight. Next, the contact angles of water, mineral oil and dodecane were measured. One drop of the solvent was placed on the slide and an image was captured. Imaging software was used to measure the angle of contact as 150, 128, and 96° for water, mineral oil and dodecane, respectively. The surface tension for water, mineral oil, and dodecane are 0.073, 0.029, and 0.024 N/m, respectively.

Example 2

Perfluorooctyl polyhedral silsesquioxane was prepared by adding 5.48 grams of H,1H,1H,2H,2H-perfluorodecyltriethoxysilane (10.7 mmol), 0.27 g or nanopure water (15.0 mmol), and 2.88 mg of potassium hydroxide (KOH, 0.0015 mmol) to a 10 mL volumetric flask. Ethanol was added to fill the remaining balance to the 10-mL amount. The reaction mixture was transferred to a 25-mL round bottom flask and stirred under nitrogen at room temperature for 24 hours. The solvent was removed en vacuo and the product recrystallized in a minimal amount of hot ethanol.

The above prepared fluoroalkyl silsesquioxane (1.4 wt. %) was added to 5 wt. % Hyflon in Fluorinert™ FC-40 (7.04 wt. %), Fluorinert™ FC-40 (84.5 wt. %), and polyurethane (7.06 wt. %). The formulation with added modifier was then sonicated using Hielscher Ultrasound Technology at an amplitude of 80 for a period of 5 minutes until a homogenous colloidal suspension was achieved. The suspension may be applied using standard coating/spray techniques.

A clean glass slide was coated with the omniphobic solution by dripping it onto the slide using a pipet, and the solvent was evaporated by drying in an oven at 110° C. for 15 minutes. Next, the contact angle of water, mineral oil and dodecane was measured. One drop of the solvent was placed on the slide and an image was captured. Imaging software was used to measure the angle of contact as 163, 139, and 109° for water, mineral oil and dodecane, respectively.

Example 3

The fluoroalkyl silsesquioxane modifier from Example 2 (0.9 wt. %) was added to 5 wt. % Hyflon in Fluorinert™ FC-40 (9.0 wt. %), and Fluorinert™ FC-40 (90.1 wt. %) to form Solution A. Solution B was prepared by mixing the nanogel aerogel particles (2.2 wt. %), polyurethane (8.9 wt. %) and acetone (88.9 wt. %) in a 100 mL beaker and sonicating using Hielscher Ultrasound Technology at an amplitude of 80 for a period of 5 minutes until a homogenous suspension was achieved. Solutions A and B were mixed and then sonicated for 3 minutes prior to use.

The suspension was applied by standard dip coating techniques by dipping a swatch of cotton fabric into the omniphobic solution, removing the excess coating, and drying the fabric in an oven at 65° C. overnight. The fabric was taped into place on a glass slide for contact angel measurements. One drop of the solvent was placed on the fabric and an image was captured. Imaging software was used to measure the angle of contact as 164, 141, and 122° for water, mineral oil and dodecane, respectively.

Example 4

A superomniphobic coating was accomplished by sonicating F-POSS (1.0 wt. %), polyurethane (22.2 wt. %), Fluorinert™ FC-40 (71.3 wt. %), and 5 wt. % Hyflon in Fluorinert™ FC-40 (5.5%) using a Hielscher Ultrasound Technology at an amplitude of 80 for 1 hour to convert the caged F-POSS structure into a polysiloxane. This solution was used to dip coat glass, plastic, paper, and Kevlar. Each coated item yielded superomniphobic contact angles (>150) for water, mineral oil, and petroleum.

Example 5

A superomniphobic coating was accomplished by sonicating perfluorodecyl silatrane (1.2 wt. %), polyurethane (6.9 wt. %), acetone (85.0 wt. %), and 5 wt. % Hyflon in Fluorinert™ FC-40 (6.9%) using a Hielscher Ultrasound Technology at an amplitude of 80 for 1 hour. This solution was used to dip coat glass and plastic, yielding superomniphobic contact angles (>150) for water, mineral oil, and petroleum.

While there have been shown and described what are at present considered the preferred embodiments of the invention, those skilled in the art may make various changes and modifications which remain within the scope of the invention defined by the appended claims.

What is claimed is:

1. A composition useful for producing a superomniphobic coating on a substrate, the composition comprising a colloidal suspension of a fluorinated siloxane in a non-silicon-containing fluorinated solvent, wherein said fluorinated siloxane has the following structure:

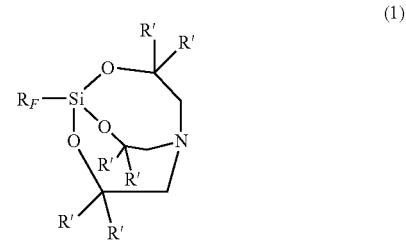

wherein $R_F$ is a fluorinated alkyl group having at least three carbon atoms, and R' is independently selected from hydrogen atom and alkyl groups having 1-6 carbon atoms, wherein said alkyl groups are optionally substituted with fluorine atoms.

2. The composition of claim 1, wherein said non-silicon-containing fluorinated solvent has a melting point below 0° C.

3. The composition of claim 1, wherein said non-silicon-containing fluorinated solvent is selected from the group consisting of a perfluorinated hydrocarbon having at least six carbon atoms; perfluorinated trialkylamine; perfluorodialkyl ether; fluorinated alcohol; and perfluoroalkylated tetrahydrofuran.

4. The composition of claim 1, wherein $R_F$ is a fluorinated alkyl group having at least five carbon atoms.

5. The composition of claim 1, further comprising particles of a hydrophobized metal oxide.

6. The composition of claim 5, wherein said hydrophobized metal oxide is silicon oxide.

7. The composition of claim 5, wherein said hydrophobized metal oxide is fluorinated.

8. The composition of claim 1, further comprising a non-silicon-containing fluorinated polymer.

9. The composition of claim 1, further comprising particles of a hydrophobized metal oxide and a non-silicon-containing fluorinated polymer.

10. A method for rendering a substrate superomniphobic, the method comprising depositing the composition according to claim 1 onto said substrate to form a coated substrate, followed by subjecting the coated substrate to a drying step to remove a liquid phase of the composition according to claim 1.

11. The method of claim 10, wherein the non-silicon-coating fluorinated solvent is selected from the group consisting of a perfluorinated hydrocarbon having at least six carbon atoms; perfluorinated trialkylamine; perfluorodialkyl ether; fluorinated alcohols; and perfluoroalkylated tetrahydrofuran.

12. The method of claim 10, wherein $R_F$ is a fluorinated alkyl group having at least five carbon atoms.

13. The method of claim 10, wherein said colloidal suspension further comprises particles of a hydrophobized metal oxide.

* * * * *